United States Patent
Edwards

(10) Patent No.: US 8,116,529 B2
(45) Date of Patent: Feb. 14, 2012

(54) POPULATING FLEET MAINTENANCE DATA USING 2D FEATURE RECOGNITION

(75) Inventor: William Talion Edwards, Foristell, MO (US)

(73) Assignee: The Boeing Company, Chicago, IL (US)

( * ) Notice: Subject to any disclaimer, the term of this patent is extended or adjusted under 35 U.S.C. 154(b) by 557 days.

(21) Appl. No.: 12/396,386

(22) Filed: Mar. 2, 2009

(65) Prior Publication Data

US 2010/0223163 A1    Sep. 2, 2010

(51) Int. Cl.
*G06K 9/00* (2006.01)

(52) U.S. Cl. .................................. 382/104; 382/209

(58) Field of Classification Search .............. 382/104
See application file for complete search history.

(56) References Cited

U.S. PATENT DOCUMENTS

| | | | |
|---|---|---|---|
| 6,735,328 B1 * | 5/2004 | Helbing et al. | 382/117 |
| 2002/0161533 A1 * | 10/2002 | Uegaki | 702/35 |
| 2007/0165021 A1 * | 7/2007 | Hanke | 345/419 |

OTHER PUBLICATIONS

"Photosynth", Microsoft Live Labs, retrieved on Feb. 19, 2009 at http://livelabs.com/photosynth/ , 2 pgs.
Wikipedia, "Feature (CAD)", retrieved on Feb. 19, 2009 at http://en.wikipedia.org/wiki/Feature_(CAD), 1 pg.
Wikipedia, "Simultaneous Localization and Mapping", retrieved on Feb. 19, 2009 at http://en.wikipedia.org/wiki/Simultaneous_localization_and_mapping, 2 pgs.

* cited by examiner

*Primary Examiner* — Sath V Perungavoor
(74) *Attorney, Agent, or Firm* — Caven & Aghevli LLC

(57) ABSTRACT

Methods and systems for populating fleet maintenance data using 2D feature recognition are disclosed. In one embodiment, a method of determining a configuration of a vehicle includes surveying the vehicle using an imaging device to generate 2D imagery of a configuration of the vehicle. The generated 2D imagery of the configuration may be compared to a survey library of 2D images to identify a part in the configuration. Existing data from legacy systems may be extracted for the part. The part may be added to a bill of materials and used to create a 3D model of the vehicle.

15 Claims, 8 Drawing Sheets

POPULATING FLEET MAINTENANCE DATA USING 2D FEATURE RECOGNITION

TECHNICAL FIELD

The present disclosure teaches item identification using 2D imagery, and more specifically, determination of a vehicle configuration using 2D imagery.

BACKGROUND

Vehicle maintenance is an ongoing occurrence for typical vehicles that have a relatively long in-service lifespan and include a large capital investment such that maintenance is preferable over vehicle replacement. Vehicles such as aircraft, maritime vessels, automobiles, and other large investment assemblies routinely undergo maintenance at regular intervals to maintain the vehicles and occasionally upgrade the vehicles with new components to improve vehicle performance.

Part identification for replacement and/or retrofitting a vehicle is often an important task in vehicle maintenance. People often rely on a bill of materials (BOM) to identify parts of a vehicle. However, a BOM may be incomplete or not available for many vehicles. For instance, small batch production vehicles, older vehicles near the end of their in-service lifespan, and/or highly modified vehicles may not have a complete bill of materials. In addition, some vehicles may include a variety of different configurations, where some of the configurations use different parts than other configurations. For example, one vehicle configuration may use one type of propulsion unit while another vehicle configuration may use a second type of propulsion unit. Therefore, knowing the type of vehicle may not enable generation of a BOM without further inspection or data.

Reduction in vehicle maintenance cycle time is particularly important because vehicles are removed from an in-service status when undergoing maintenance, which may result in large amounts of lost profits due to vehicle downtime. Some maintenance time and/or vehicle downtime may be unnecessarily spent identifying parts and then waiting for the parts to arrive when the parts are shipped from remote locations.

In some instances, it may be desirable to modify a vehicle, such as by retrofitting a vehicle with a new technology. For example, some older vehicles may be improved by adding a GPS (global positioning system) unit to assist with navigation. It is helpful to have detailed information about a vehicle prior to installation of new devices, particularly when many vehicles will undergo modification. For example, it may be helpful to identify an installation location of the new devices prior to receipt of the vehicle for maintenance. In addition, it may be helpful to locate power sources, restrictive structures, or other important considerations prior to receipt of the vehicle to enable installation of a new device without excessive service time, and thus reduce the downtime of the vehicle.

SUMMARY

Methods and systems for populating fleet maintenance data using 2D feature recognition are disclosed. In one embodiment, a method of determining a configuration of a vehicle includes surveying the vehicle using an imaging device to generate 2D imagery of a configuration of the vehicle. The generated 2D imagery of the configuration may be compared to a survey library of 2D images to identify a part in the configuration. Existing data from legacy systems may be extracted for the part. The part may be added to a bill of materials and used to create a 3D model of the vehicle.

In another embodiment, a system may include a survey library to store 2D imagery of parts of a group of vehicles. The 2D imagery may be associated with part identifiers used to link the parts to additional data associated with the parts. The system may also include a survey module to obtain 2D imagery of parts of a vehicle in the group of vehicles. A data analyzer may be included to compare the obtained 2D imagery with imagery in the survey library where the comparison creates a part match and an associated match score for each part of the vehicle that is identified in the survey library. The system may also include a configuration builder to select parts from part matches having a match score exceeding a threshold where the configuration builder generates a revised bill of materials of the parts of the vehicle.

In a further embodiment, a method of performing maintenance on a vehicle includes surveying an in-service vehicle with an imaging device to create 2D vehicle imagery associated with position information of the imagery. The 2D vehicle imagery may be matched to imagery of known parts in a survey library where the imagery of known parts is associated with a part identifier. The matching may determine a matched part of the in-service vehicle and the part identifier. A bill of materials (BOM) may be generated by adding the part identifier to a list of parts of the vehicle. Maintenance may be performed on the vehicle by identifying parts using the BOM.

The features, functions, and advantages can be achieved independently in various embodiments of the present disclosure or may be combined in yet other embodiments.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

As discussed above, it is desirable to reduce maintenance time and downtime of vehicles, which in turn may reduce maintenance costs and lost profits resulting from the vehicle downtime. Techniques for populating fleet maintenance data are disclosed herein which address these concerns. Some techniques include a survey process using two dimensional (2D) feature recognition to quickly identify parts (or subassemblies) of a vehicle, machine, etc. A survey data library and existing part information may enable part identification via a comparison process, which may then be used to create or modify a bill of materials (BOM) and/or build a model of the vehicle. The model of the vehicle may include a three-dimensional (3D) model of the vehicle, which may be formed using 2D imagery, computer aided design (CAD) drawings, or other available data about the system or its respective parts. The improved BOM and/or 3D model of the vehicle may enable a reduction in maintenance time by enabling planning, part acquisition, and other tasks prior to receiving the vehicle. As discussed herein, the techniques may be implemented on vehicles, which includes without limitation, aircraft, maritime vessels, spacecraft, motor vehicles, mechanical devices, and other vehicles or machines that receive maintenance.

Illustrative Environment

Figure 1:
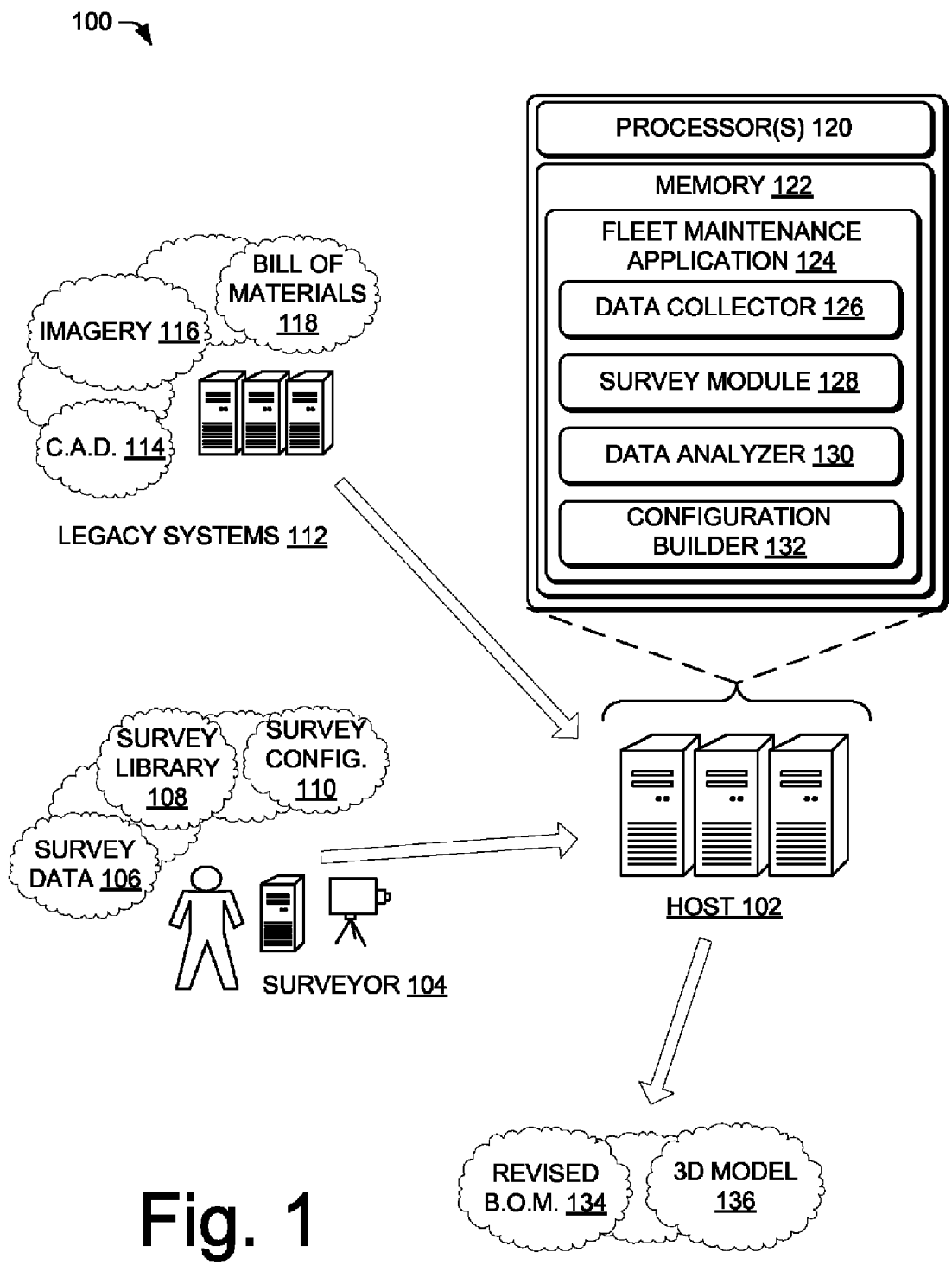
FIG. 1 is a schematic diagram of an illustrative computing environment to populate fleet maintenance data using 2D feature recognition.

FIG. 1 is a schematic diagram of an illustrative computing environment 100 to populate fleet maintenance data using 2D feature recognition. The computing environment 100 includes a host 102, which communicates with various systems to obtain information about a vehicle, and thus populate fleet maintenance data.

In one or more embodiments, the host 102 communicates with a surveyor 104 that provides survey data 106 to the host. The survey data 106 may be information collected from observing existing parts, assemblies, or complete vehicles. For example, the survey data 106 may include photographs or other imagery, measurements, and other information gained through human-based and/or machine-based observation of a vehicle. In addition, the surveyor 104 may maintain a survey library 108 of existing survey data. For example, the survey library 108 may include various 2D imagery (e.g., digital photography, thermo photography, x-ray imaging, etc.), or other types of imagery (e.g., optical metrology, etc.) that may be used to identify an unknown part during a subsequent inquiry via a comparison process. The survey data in the survey library 108 may be supplemented with additional information, such as part numbers, part descriptions, measurements, position information, or other data relevant to the a part of a vehicle.

The surveyor 104 may also include a survey configuration 110. The survey configuration 110 may include 2D imagery of a part, assembly, or vehicle that may be scheduled for maintenance. In addition, the survey configuration 110, as well as the survey library 108, may include other data such as position information, human generated reports, reverse engineering data, measurements, part identifiers (e.g., item number, etc.), or other data extracted from a vehicle (or portion thereof) via a human or machine. As discussed herein, the host 102 may compare the survey configuration 110 to other data, such as the survey library, to populate fleet maintenance data and determine a configuration of a vehicle that has scheduled maintenance.

Legacy systems 112 may communicate additional vehicle information to the host 102. Collectively, the legacy systems 112 represent accumulated vehicle information of a particular entity that employs the host 102. As such, the legacy systems 112 may include integrated and/or disparate systems made up of servers that host a wide range of part information. At a high level, the legacy systems 112 may include CAD data 114, imagery 116, and bill of materials (BOMs) 118.

The CAD data 114 may include 2D and 3D models of parts, assemblies or vehicles. Typically, the CAD data 114 may include CAD data for parts designed using CAD, whereas older vehicles may not include CAD data for some or all of their parts. The imagery 116 may include photographs, optical metrology, x-rays, or other imagery that may provide graphical information about parts of a vehicle. Finally, the BOMs 118 may be available for the vehicles that provide non-graphical information associated with the vehicle. The BOM 118 may be incomplete in some instances as to every part included in a vehicle, but may describe various aspects of known parts, such as a part name, part number, part manufacturer, among other possible part data.

The host 102 may be equipped with one or more processors 120 and memory 122. The memory 122 may include applications, modules, and/or data. In some embodiments, the memory 122 may include a fleet maintenance application 124, which may facilitate populating fleet maintenance data by collecting information about vehicles from the surveyor 104 and/or the legacy systems 112.

The fleet maintenance application 124 may include a number of modules such as a data collector 126, a survey module 128, a data analyzer 130, and a configuration builder 132. In some embodiments, the data collector 126 obtains data from the legacy systems 112. The data collector 126 may format data or otherwise modify the data to enable further analysis of the data. For example, imagery data may be converted to a particular format of images, which may enable rapid comparison of images or feature identification within the images.

In various embodiments, the survey module 128 accesses the survey data 106 and/or the survey library 108 and interacts with the surveyor 104 to assist in generation of the survey configuration 110. For example, the survey module 126 may be used to request a survey of a vehicle due for maintenance. In addition, the survey module 126 may query data in the survey library 108 to query existing known parts.

The data analyzer 130 may compare the survey configuration 110 to existing data from various sources (e.g., the survey library 108, the legacy systems 112, etc.) to identify parts of the vehicle. For example, the data analyzer 130 may determine a unique feature of a 2D image of a part obtained from the survey configuration 110. The data analyzer 130 may then compare the unique feature to images in the survey library to generate a list of matching parts. The matching parts may be further analyzed to determine which part is included in the survey configuration.

Finally, the configuration builder 132 may create a configuration of the vehicle based on the output of the data analyzer 130. For example, the configuration builder 132 may generate a revised BOM 134 (or complete BOM in some instances). In addition or an alternative, the configuration builder 132 may generate a 3D model 136 of the vehicle. The 3D model 136 may be a layout model, exploded view model, CAD model, or rudimentary 3D model of the vehicle.

Figure 2:
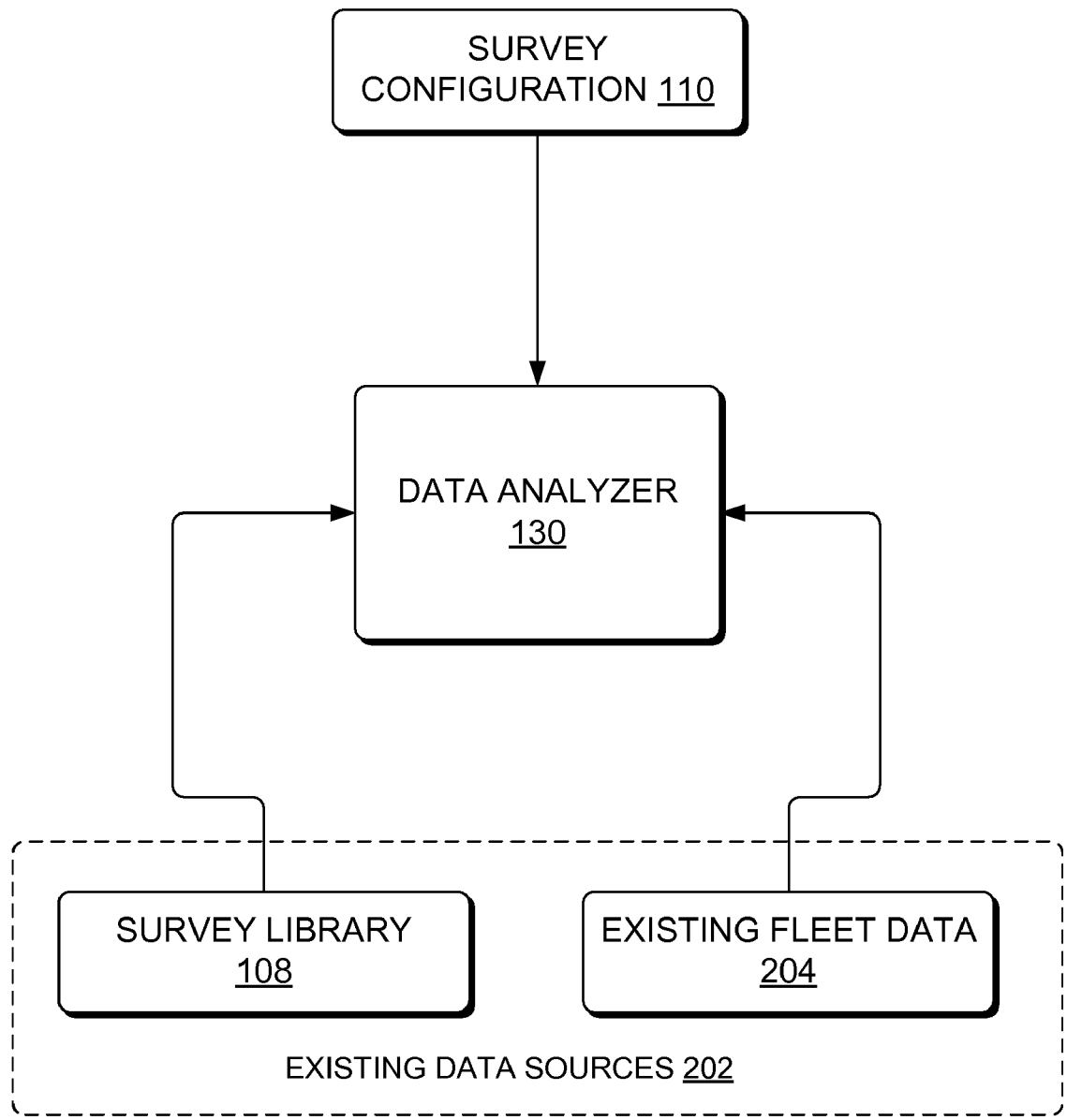
FIG. 2 is a schematic diagram of an illustrative data analyzer in communication with various data sources to enable determination of a vehicle configuration using survey data and existing fleet data.

FIG. 2 is a schematic diagram of an illustrative fleet maintenance system 200 including the data analyzer 130 in communication with various data sources to enable determination of a vehicle configuration. The various data sources may include data obtained from the surveyor 104 and/or the legacy systems 112 as discussed with reference to FIG. 1.

The data analyzer 130 may receive the survey configuration 110, which may be obtained by the surveyor 104 under the direction of the survey module 128 in FIG. 1. In an example, the survey module 128 may direct the surveyor 104 to generate survey data of a particular aspect of a survey configuration 110 (e.g., photograph of a part from a particular perspective), which may include 2D imagery of a vehicle designated for maintenance.

The data analyzer 130 may also receive data from existing data sources 202, which may include the survey library 108 and existing fleet data 204. The existing fleet data 204 may include an extensive volume of existing definition data stored and managed by the legacy systems 112 of FIG. 1. As such, the existing fleet data 204 may include the CAD data 114, the imagery 116, the BOM 118, and other existing data.

In accordance with various embodiments, the data analyzer 130 may then compare the data received from the survey configuration 110 to the survey library 108 to identify a part of the vehicle. The data analyzer 130 may compare characteristic features of a survey configuration image to survey images in the survey library 108 to identify the part of the vehicle. Next, the part identity may be used to obtain further information about the part from the existing data sources 202 including the CAD data 114, the imagery 116, or additional BOM information from the BOM 118, which may reside in the legacy systems 112.

In one or more embodiments, the data analyzer 130 may obtain and manipulate spatial/position information obtained from the survey configuration 110 in reference to the existing fleet data. For example, the data analyzer 130 may enable construction of a 3D model (e.g., via the configuration builder 132, etc.) by obtaining part information and combining it with spatial/position information. Ultimately, the data analyzer 130 may manipulate data to enable updating a BOM and construction at least a portion of a 3D model of a vehicle designated for maintenance by comparing the survey configuration 110 to the existing data sources 202.

Illustrative Operation

Figure 3:
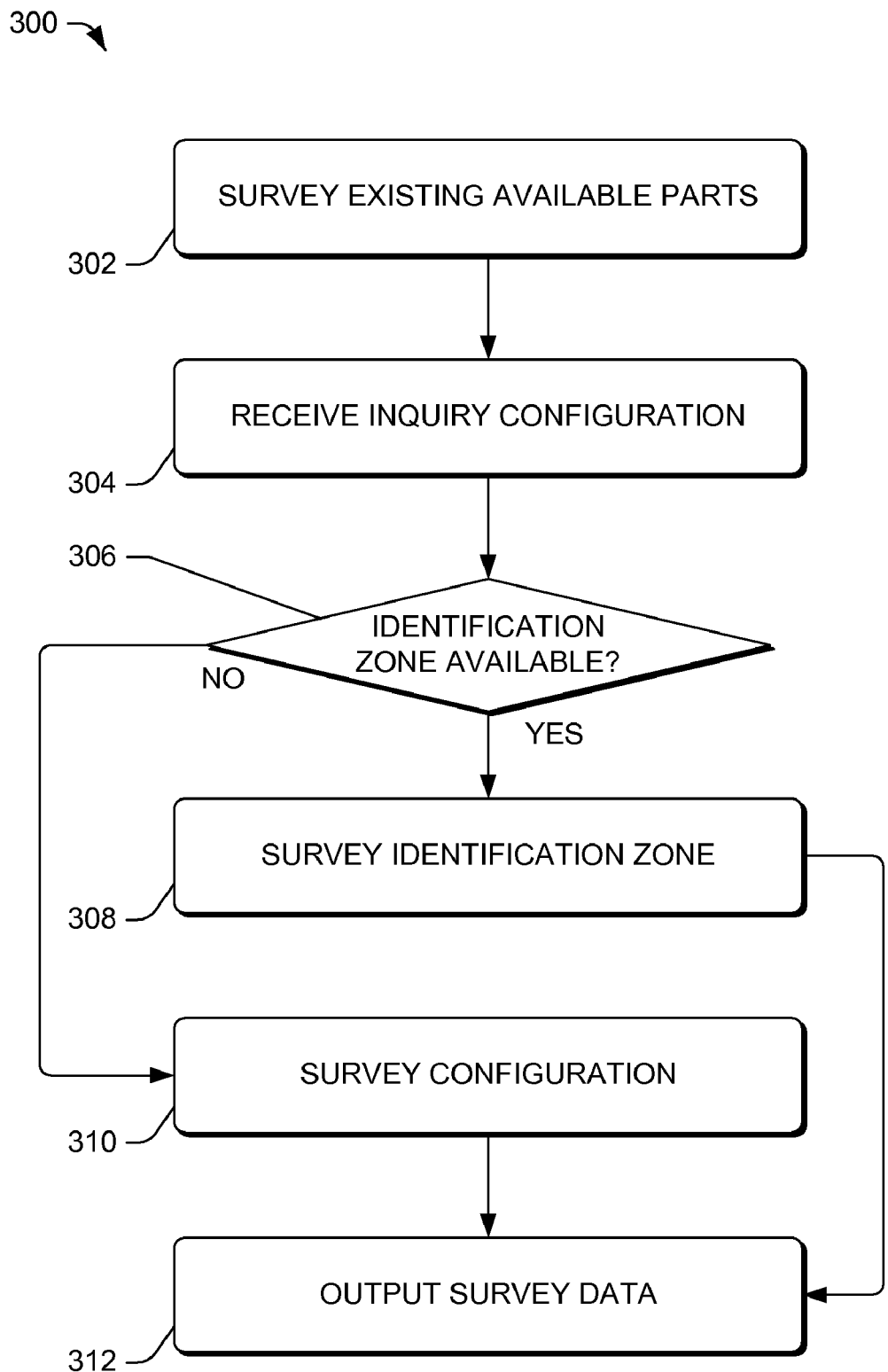
FIG. 3 is a flow diagram of an illustrative process to survey vehicles.

FIG. 3 is a flow diagram of an illustrative process 300 to survey vehicles. The process 300 is illustrated as a collection of blocks in a logical flow graph, which represent a sequence of operations that can be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to process 300, shall be interpreted accordingly. The process 300 may be performed, at least in part, by the surveyor 104 and the survey module 128 of FIG. 1.

At 302, the surveyor 104 may survey existing available parts to create the survey library 108. In some embodiments, available parts may be surveyed by obtaining 2D imagery of the available parts. An available part may be photographed from many different angles, orientations, and/or perspectives to create a thorough graphical record of the item that may be later used as a "fingerprint" of the part. In one or more embodiments, the 2D imagery may be obtained by photographing individual parts, assemblies of parts, or the part in connection with a vehicle. The fingerprint(s) may then be stored in the survey library 108.

In addition to 2D imagery, other data may be obtained at 302, either by automated processes that control machines, human processes, or a combination thereof. In various embodiments, part identifiers (e.g., part name, part number, etc.), position information, measurements, or other data may be extracted from a part and stored in the survey library 108. For example, the 2D imagery may include a part number visible in the image. Known character recognition techniques may be used to extract the part number from the image, which may then be stored in association with the image in the survey library 108.

At 304, the surveyor 104 may receive an inquiry of a vehicle configuration. For example, maintenance may be requested for an existing vehicle, which is made available to the surveyor 104 for inspection. In some embodiments, the inquiry may include additional information, such as an identification zone of the vehicle that may be used to determine the configuration of the vehicle. For example, the surveyor 104 may inspect the identification zone, such as a feature of a propulsion unit, to identify the configuration of the vehicle or assembly, or to identify the part(s).

If an identification zone is available, and confirmed at 306, the surveyor 104 may quickly survey the vehicle by obtaining the survey configuration 110 of the identification zone at 308. For example, the surveyor 104 may obtain multiple photographs of the identification zone at 308, which may be subsequently matched to the imagery in the survey library 108 to determine the configuration of the vehicle.

Alternatively, if an identification zone is not available as determined at 306, the surveyor 104 may survey the vehicle by obtaining the survey configuration 110 of many portions of the vehicle such that survey information includes 2D imagery of some or all of the vehicle's parts. As such, the operation 310 is likely to be more time consuming than the operation 308 because the operation 310 may require generating more 2D imagery and collecting more data from the vehicle as compared to the process 308 which may only survey the identification zone of the vehicle.

In various embodiments, the surveyor may be an automated system that includes little or no human interaction. For example, the surveyor 104 may be a computer controlled camera that is capable of taking photographs of a vehicle from various locations via a position system. The position system may use tracks, dollies, mechanical arms, and/or other apparatus to move a camera to positions that have known positional data (e.g., 3D coordinates, etc.). The surveyor may use various cameras to simultaneously survey the vehicle, among other possible techniques to quickly survey the vehicle. 2D imagery may increase the speed and quality of data collection as compared to traditional survey techniques which often included many human-based activities that may be prone to reduced accuracy. Digital photography, panoramic photography, x-ray photography, video photography or other line of sight imagery may be used to create the 2D imagery.

At 312, the surveyor 104 may output survey data. For example, the surveyor 104 may enable the survey module 128 to obtain data from the survey library 108 and/or the survey configuration 110, which may ultimately be used to determine a configuration of the vehicle including the revised BOM 134 and/or the 3D model 136.

Figure 4:
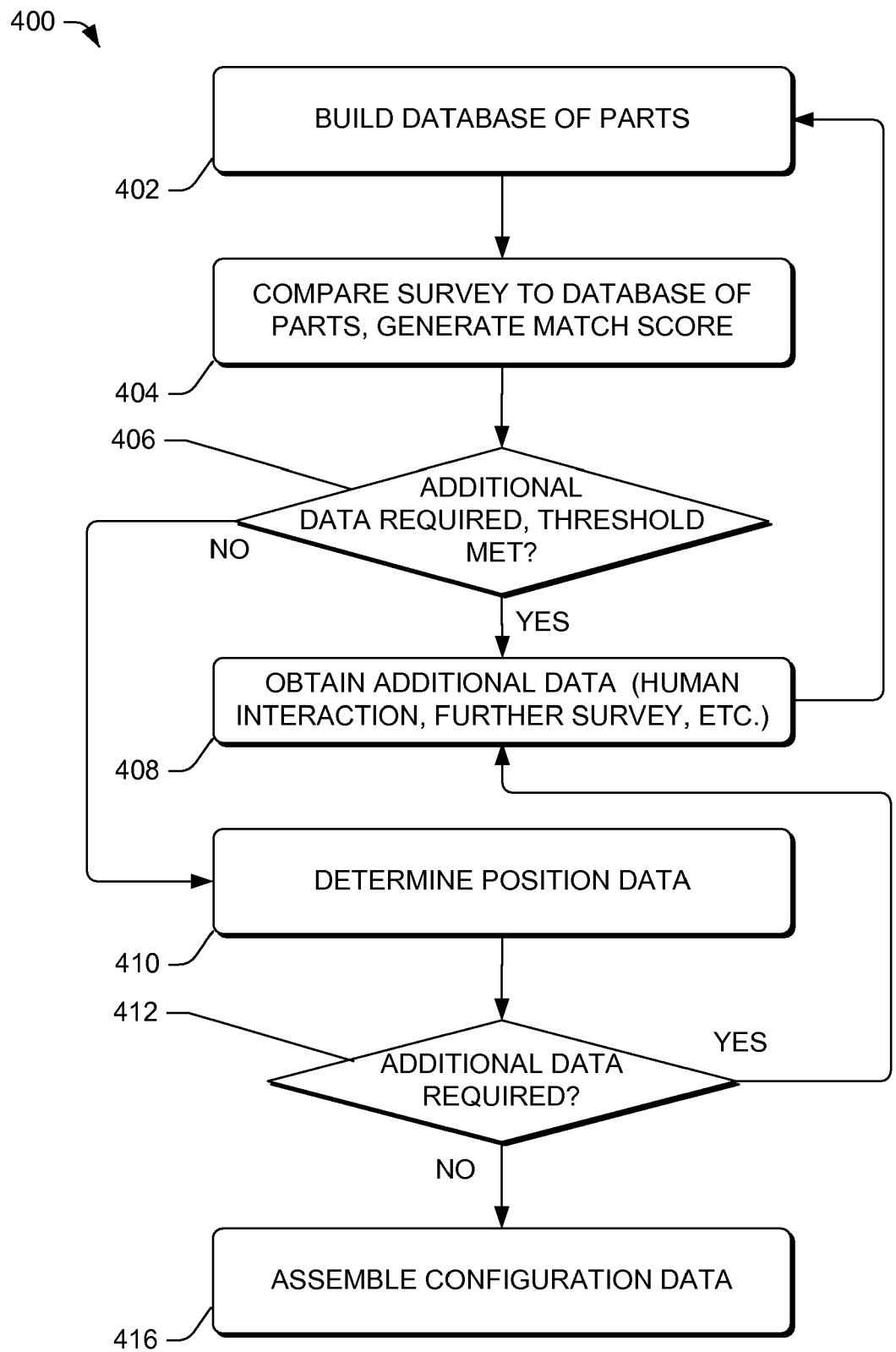
FIG. 4 is a flow diagram of an illustrative process to analyze survey information to create a vehicle configuration.

FIG. 4 is a flow diagram of an illustrative process 400 to analyze survey information to create a vehicle configuration. The process 400 may be performed, at least in part, by the data collector 126, the survey module 128, and the data analyzer 130 of FIG. 1. The data analyzer may be responsible for developing a characterization of parts (components, etc.) of a vehicle by comparing obtained data (e.g., the survey configuration 110) to recognized features contained in collected data (e.g., the survey library 108). The order in which the operations are described is not intended to be construed as a limitation, and any number of the described blocks can be combined in any order and/or in parallel to implement the process 400.

At 402, the data analyzer 130 may build a database of parts. The database of parts may include portions of the survey library 108, data from the legacy systems 112, and other data related to vehicle parts which may assist in maintenance of a vehicle having the part. The database may enable access of part data in response to the survey configuration 110 of a part, assembly, or vehicle. Using a feature learning process, the data analyzer 130 may apply recognition algorithms to 2D imagery to build the database having parameters peculiar to individual parts. The parameters may include specific distinct features of a part, such as the tread pattern of a wheel which can be used to accurately identify the exact wheel used by the vehicle during the survey configuration 110.

At 404, the data analyzer 130 may compare the survey configuration 110 to the database of the parts to identify a part. For example, the survey configuration 110 of a part may include multiple photographs of the part. Using known techniques including image recognition (e.g., algorithms similar to those used for face recognition, fingerprinting, etc.), the survey configuration imagery (e.g., photographs, etc.) may be matched to an image in the database of part (from the survey library 108). The comparison at 404 may result in a conclusive data acquisition if a match is successful or an inclusive acquisition if a match is not successful with 2D imagery in the database of parts. For example, a wheel may be identified by its relative size in compared to another known part, by a thread pattern matching existing 2D imagery via a comparison, and so forth. In further embodiments, a wheel may be identified by a part identifier shown in an image of the part (and extracted via character recognition).

In some embodiments at 404, a numerical analysis may be performed when matching the survey configuration 110 to the survey library 108, which may result in a match score. The match score may then be compared to a threshold value, where the match score indicates a match is made if it reaches or exceeds the threshold score.

If a match is not made at 404, or an insufficient match score is obtained, additional data may be required at 406. The additional data may be obtained at 408 by human interaction, further surveys, and so forth. If additional data is necessary, the data may be used to enhance the database of parts at 402 upon completion of the acquisition of addition data. In this way the data analyzer 130 updates known data to enhance the system for future use.

If a match is successful at 404 and additional data is not desired or necessary at 406, then the data analyzer 130 may continue to 410 to optionally determine position data. The position data may enable assembling images of parts into the 3D model 136. In some embodiments, the position data may include position information from other data sources, such as the CAD data 114. Position data may also be derived from the 2D imagery, particularly when the position of the imaging device (e.g., digital camera, x-ray, etc.) is known. For example, when cameras are positioned in known positions relative to a part (fixed camera positions, known positions of movable cameras attached to a movable arm, track, etc.) the position of the part may be derived from collected data to enable assembling the 3D model 136.

At 412, the data analyzer may determine if additional data is necessary to determine the position information. If additional information is necessary, then the additional information may be obtained via the operation 408. If no additional information is necessary at 412, the position data may be complete at the operation 410.

Finally, the data analyzer 130 may determine the identity of one or more parts from the survey configuration 110 to create configuration data at 416. The configuration data may include a part identifier (e.g., part number, part name, etc.), part position data, and/or other data associated with the part, assembly, or vehicle. Ultimately, via the configuration builder 132, the configuration information may be used to generate the revised BOM 134, or when including position data, the configuration information may be used to generate the 3D model 136 of the part, assembly, and/or vehicle.

Figure 5:
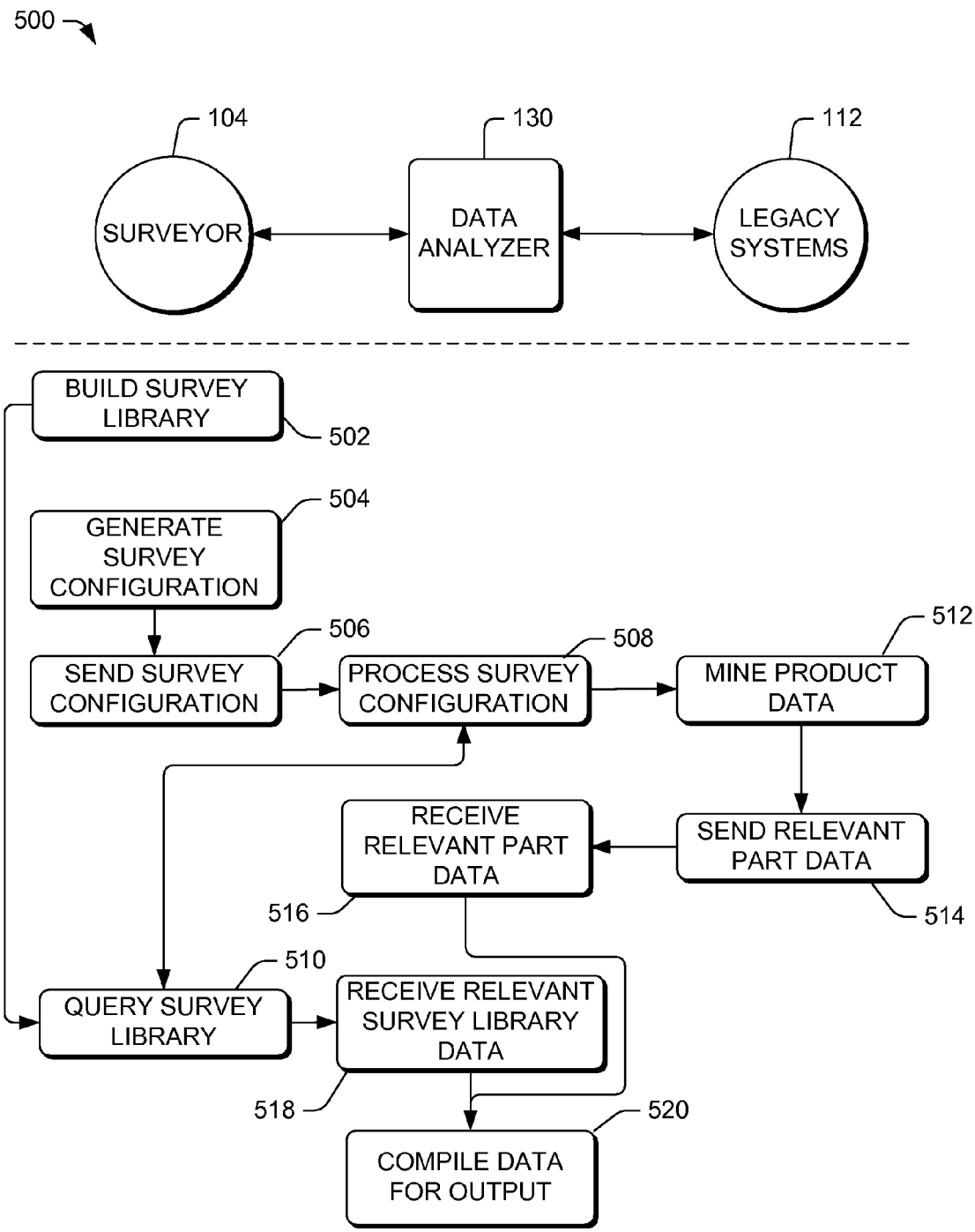
FIG. 5 is a flow diagram of an illustrative process to determine a vehicle configuration, the process including interactions between a surveyor, an analyzer, and a product data manager.

FIG. 5 is a flow diagram of an illustrative process 500 to determine vehicle configuration including interactions between a surveyor, an analyzer, and a product data manager. The process 500 includes operations listed under respective components (the surveyor 104, the data analyzer 130, and the legacy systems 112) which may perform the operations. The order in which the operations are described is not intended to be construed as a limitation, and any number of the described blocks can be combined in any order and/or in parallel to implement the process 500.

At 502, the surveyor 104 may be used to build the survey library 108, which may be composed of various 2D imagery of various parts included in a fleet of vehicles. The survey library may be built by surveying available parts and may be an ongoing process. The surveyor 104 may create the survey configuration 110 at 504. For example, a vehicle may be scheduled for maintenance. In advance of the maintenance while the vehicle is still in-service, the surveyor 104 may obtain 2D imagery, among other possible data collected for a vehicle, which is stored as the survey configuration 110. For example, the in-service vehicle may be temporarily made available to obtain the survey configuration 110 (2D imagery) prior to being removed from an in-service status to perform extended maintenance. The surveyor 104 may transmit the survey configuration 110 to the data analyzer 130, which may be received by the data analyzer.

The data analyzer 130 may process the survey configuration at 508. For example, the processing may include locating unique features, identifying part identifiers (part number, etc.) using character recognition (e.g., fingerprinting, etc.) or other techniques, or by performing other data analysis to enable comparison of the survey configuration to other data including the existing data sources 202 (e.g., the survey library 108, the existing fleet data 204).

At 510, the surveyor may query the survey library 108 to transmit survey information to the data analyzer 130 for receipt at 518. The data analyzer 130 may compare the survey configuration 110 to the queried survey library to identify the part. For example, the 2D imagery of the survey configuration may be used as a fingerprint in a comparison against the survey library 108, as performed by the data analyzer 130. A match of the survey configuration 110 to the survey library may result in an identification of a part, assembly, or vehicle. In some embodiments, the match information may be transmitted back to the data analyzer 130 and received at 508 for use in querying the legacy systems at 512.

In accordance with some embodiments, the processed survey configuration and/or query survey library results from 510, may be used as an input to mine product data at 512 using the legacy systems 112. For example, the data analyzer 130 may transmit data of unique features of a part, a part identification number, or other part information to the legacy systems 112, which in turn may retrieve relevant part data for transmission back to the data analyzer at 514.

At 516, the data analyzer 130 may receive the relevant part data. The relevant part data may include the CAD data 114, the imagery 116, the BOM 118, or other data associated with the part identified via data analysis of the survey configuration 110.

Finally, at 520, the data analyzer may compile the data for output. For example, the output may be a data transmission to the configuration builder 132. The configuration builder 132 may use the compiled data to create the revised BOM 134 and/or the 3D model 136.

Illustrative System

Figure 6:
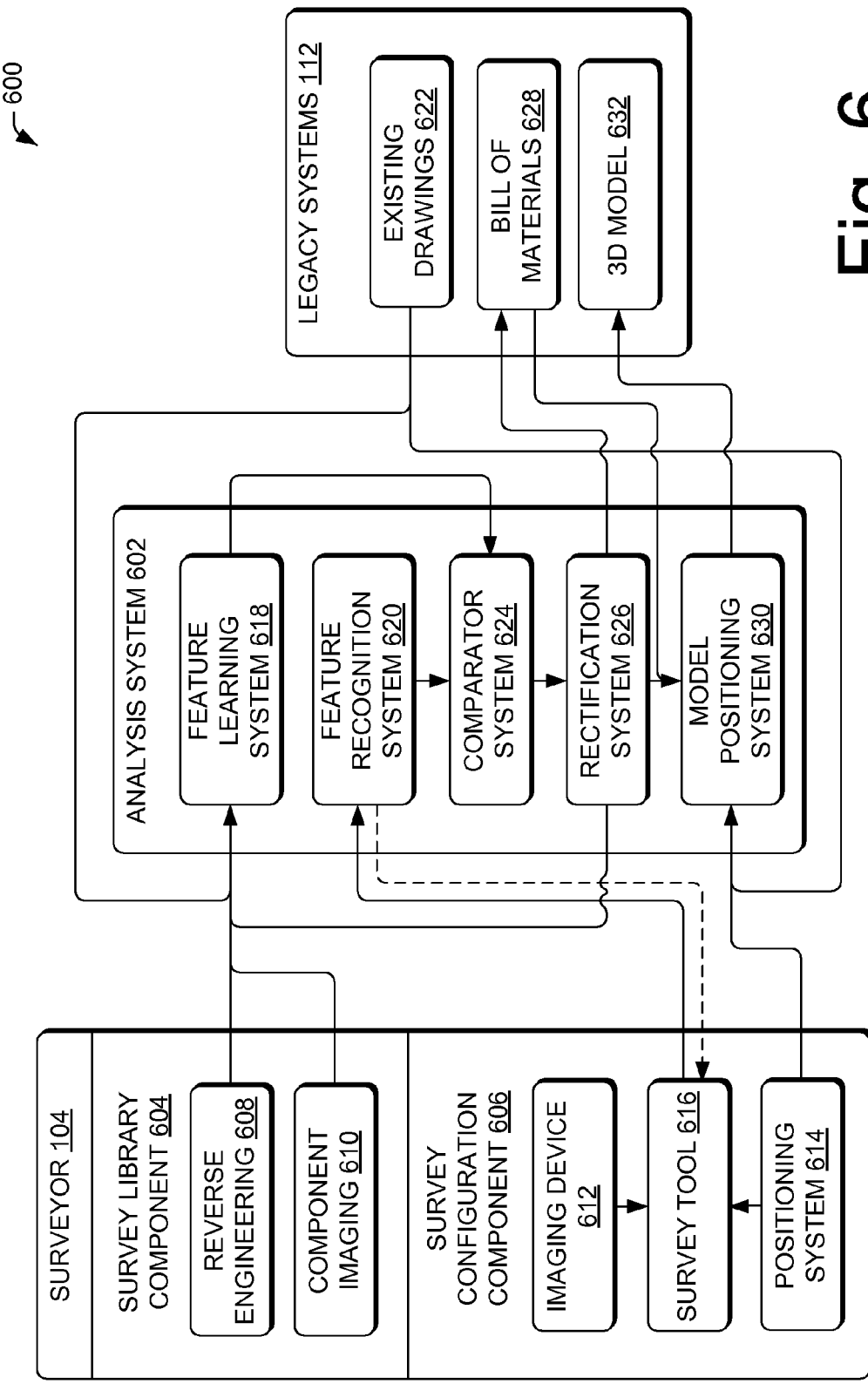
FIG. 6 is a system diagram of an illustrative system collecting vehicle data and performing analysis on the vehicle data to determine a vehicle configuration.

FIG. 6 is a system diagram of an illustrative system 600 to collect vehicle data and performing analysis on the vehicle data to determine a vehicle configuration. The system 600 integrates various subsystems which include the surveyor 104, the legacy systems 112, and an analysis system 602.

In accordance with various embodiments, the surveyor 104 includes a survey library component 604 and a survey configuration component 606. The survey library component 604 may include reverse engineering data 608 and component imaging 610. The reverse engineering data 608 may include measurements, position data, part identifications, and so forth that may be derived using human and/or machine based processes to analyze a part, assembly, and/or vehicle. The component imaging 610 may include 2D imagery of the parts in addition to associated data such as unique features in the imagery, part identifiers (e.g. part numbers, etc.) and so forth. In some embodiments, the component imaging may be associated with definition data derived from existing component drawings, CAD models, and BOM in the legacy systems 112. Further, the definitional data may be used to develop unique parameters characterizing each individual component. The set of unique parameters, 2D imagery, and other associated data may be stored in a searchable database that is made accessible to the analysis system 602.

In some embodiments, the survey configuration component 606 may include an imaging device 612 (e.g., a digital camera, an x-ray imager, a thermo imager, etc.), a positioning system 614, and a survey tool 616. The survey configuration component 606 may be used with in-service (e.g., prior in maintenance) aircraft to collect image data using the imaging device 612. The imaging device 612, or other hardware such as a track, dolly, mechanical arm, etc. may be incorporated with the position system 614 to determine a position related to each image. This may be used to ultimately create a 3D model of the part, assembly, and/or vehicle by assembling parts using known position information extracted from 2D imagery. The survey tool 616 may receive the images and positioning information and may act as a survey planning and execution tool to guide a survey during data collection, such as by indicating an identification zone. The survey may include tasks performed by humans, machines, or a combination of humans and machines. In some embodiments, the imaging device 612 may be controlled via the survey tool 616 to obtain the imagery necessary to determine a vehicle configuration. The positioning system 614 may monitor the position and orientation of the imaging system relative to a fixed frame of reference, preferably a vehicle coordinate system. This information from the positioning system 614 may be stored with the images in the survey tool 616, or may be passed directly to the analysis system 602 for further analysis.

The analysis system 602 may include a feature learning system 618 and a feature recognition system 620. The feature learning system 618 may apply recognition algorithms to existing definition data to build a database of parameters associated (and likely unique) to individual parts. Other inputs to the feature learning system 618 may include existing drawings 622, which may reside or be extracted from the legacy systems 112.

In various embodiments, the survey tool 616 may transmit data (e.g., 2D imagery and position data, etc.) to the feature recognition system 620, which may characterize each image by identifying distinctive features. If this feature recognition is performed by the feature recognition system 620 substantially concurrently with data collection by the survey configuration component 606, the analysis system 602 may provide a feedback loop to the survey tool 616 that can acknowledge when adequate data has been collected to characterize the part, or portion thereof. In further embodiments, concepts similar to those included in Simultaneous Location and Mapping (SLAM) may be used to enable combining elements of the imaging device 612 and the positioning system 614 into a single system. SLAM derives location directly from image data. Additionally or alternatively, photo-stitching software may be used to create the positional information of the position system 614, as well as matching information as discussed below.

In one or more embodiments, a comparator system 624 may be used to compare the images from the feature recognition system 620 with component peculiar unique parameters created by the feature learning system 618 to uniquely identify the part, assembly, or vehicle. Algorithms that are used in the comparator system 624 may generate a list of matches found in the survey data and a match score, which may have a relative confidence associated with each match.

In some embodiments, a rectification system 626 may receive the matches from the comparator system 624. The rectification system 626 may sort the matches found by the comparator system 624 by the match score and accept matches with a match score that exceeds or reaches a threshold value. In various embodiments, human interaction may exist to review the threshold score, to raise or lower the threshold score, and/or accept matches that are below the threshold score. The rectification system 626, or alternatively the comparator system 624, may provide an update to the bill of materials 628 showing the matched parts. The output of the rectification system 626 may also be used to improve the feature learning system 618 by incorporating results into the characterization database.

The bill of materials 628 may be stored in the legacy systems 112, and may ultimately be used by a model positioning system 630. For example, the model positioning system 630 may use the BOM 628 to reference the existing drawings 622. In some embodiments, the model positioning system 630 may use data from the positioning system 614 to orient the existing drawings 622 into a 3D model 632. For example, the 3D model 632 may include CAD drawings, 2D imagery, or other graphical data to represent the various parts of a vehicle as the 3D model. The 3D model may reflect the configuration of a vehicle that is scheduled for maintenance. Ultimately, engineers, maintenance professionals, and/or other humans may use the 3D model 632 and/or the BOM 628 to expedite maintenance of the vehicle and return the vehicle back to an in-service status. For example, the 3D model may be used to identify an installation location available for installing new hardware in the vehicle that improves the vehicle's performance, such as an improved navigational instrument.

Illustrative Implementation

Figure 7:
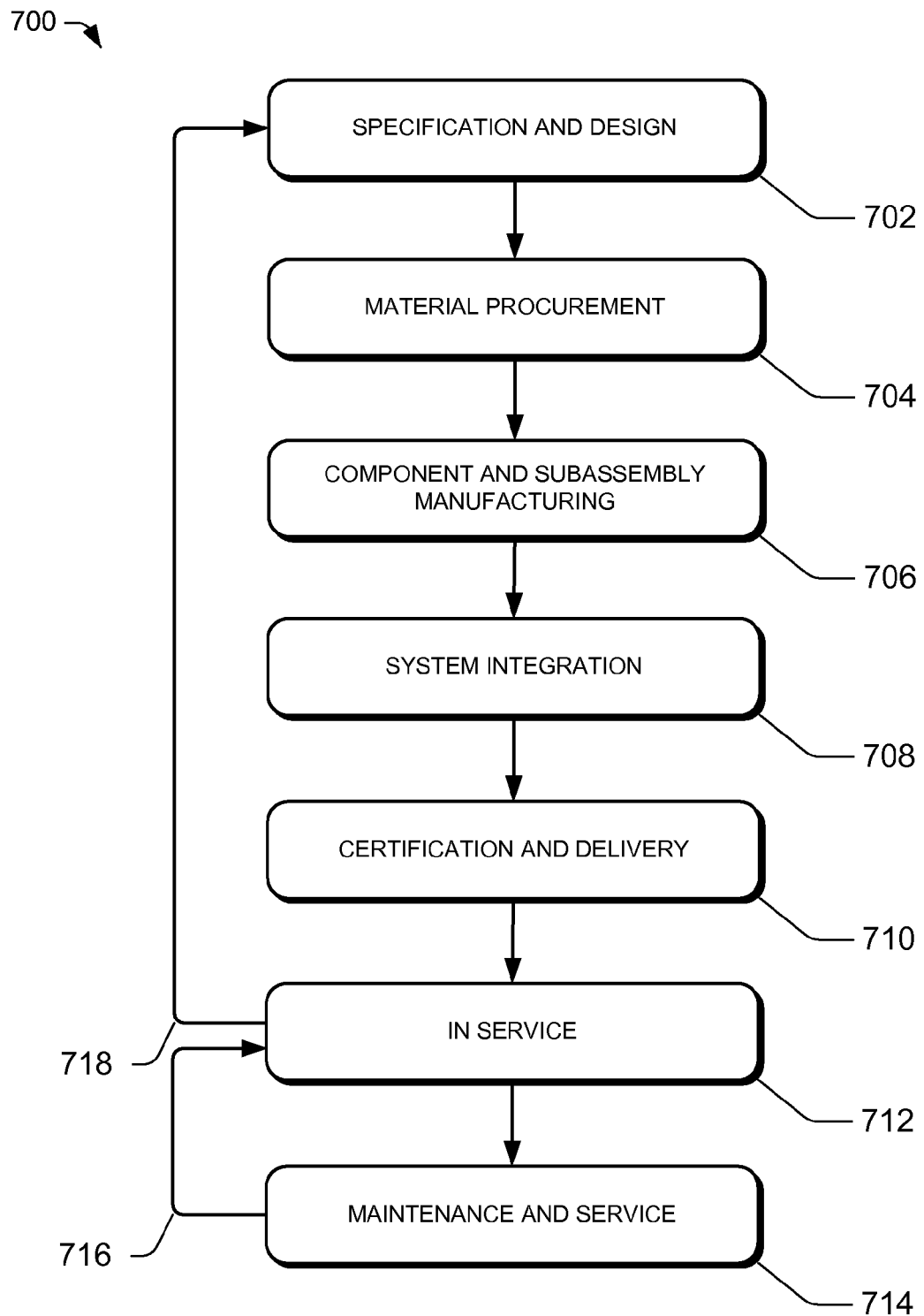
FIG. 7 is a flow diagram of an illustrative vehicle production and service methodology.
Figure 8:
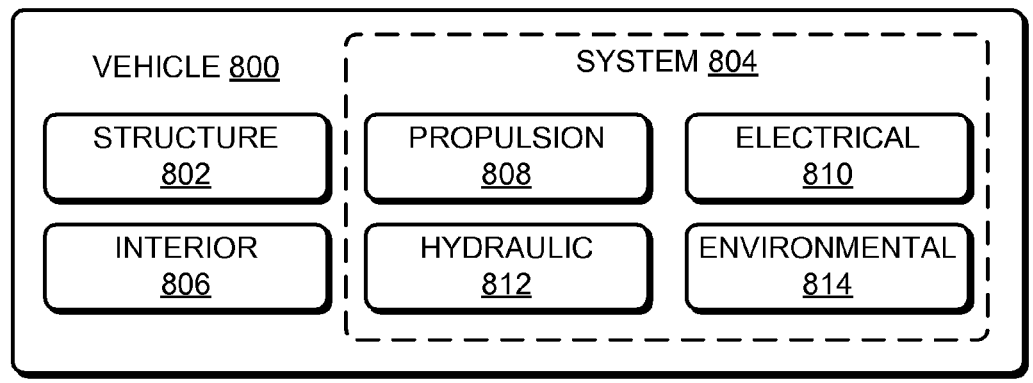
FIG. 8 is a block diagram of an illustrative vehicle including various vehicle component blocks.

Referring more particularly to the drawings, embodiments of the disclosure may be described in the context of an illustrative vehicle manufacturing and service process 700 as shown in FIG. 7 and an illustrative vehicle 800 as shown in FIG. 8. During pre-production, exemplary process 700 may include specification and design 702 of the vehicle 800 and material procurement 704, such via the BOM 628. During production, component and subassembly manufacturing 706 and system integration 708 of the vehicle 800 takes place. Thereafter, the vehicle 800 may go through certification and delivery 710 in order to be placed in-service 712. While in-service by a customer, the vehicle 800 is scheduled for routine maintenance and service 714 (which may also include modification, reconfiguration, refurbishment, and so on). In accordance with various embodiments, the analysis system 602 may be employed at the in-service 712 in anticipation of vehicle maintenance and service 714. In some embodiments, the vehicle 800 may undergo maintenance during scheduled or unscheduled intervals via a route 716 that links the in-service operation 712 and the maintenance and service operations 714 to create a recursive process. The vehicle 800 may also undergo an upgrade via a route 718 that links the in-service operation 712 and the specification and design operation 702 to create another recursive process. The upgrade may include an installation of a new system or component on an existing vehicle.

Each of the processes of method 700 may be performed or carried out by a system integrator, a third party, and/or an operator (e.g., a customer). For the purposes of this description, a system integrator may include without limitation any number of vehicle manufacturers and major-system subcontractors; a third party may include without limitation any number of venders, subcontractors, and suppliers; and an operator may be an airline, leasing company, military entity, service organization, and so on.

The various techniques (e.g., the processes 300, 400, and 500) embodied herein may be employed during any one or more of the stages of the production and service method 700. For example, one or more of embodiments of the fleet maintenance application 124, may be utilized while the vehicle 800 is in-service 712 and/or at the maintenance and service 714.

As shown in FIG. 8, the vehicle 800 produced by exemplary method 800 may include a structure (frame) 802 with a plurality of systems 804 and an interior 806. Examples of high-level systems 804 include one or more of a propulsion system 808, an electrical system 810, a hydraulic system 812, and an environmental system 814. Any number of other systems may be included. The principles of the invention may be applied many industries, such as the aerospace industry, the automotive industry, and so forth.

Figure 9:
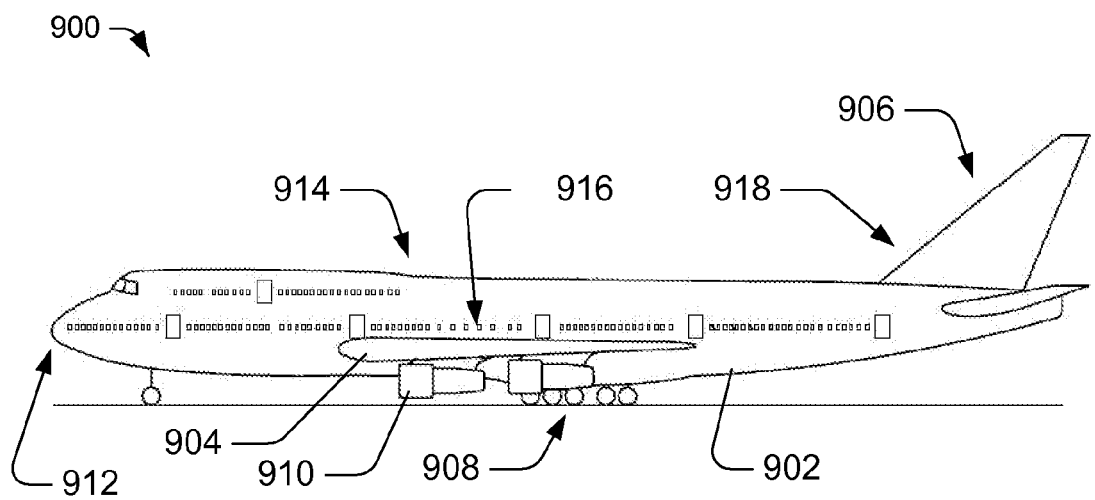
FIG. 9 is a side elevational view of an illustrative aircraft.

FIG. 9 is a side elevational view of an illustrative aircraft 900, which may experience fleet maintenance that is performed using the techniques disclosed herein. One may appreciate that the aircraft 900 may include various known and unknown parts, particularly if the aircraft has been in-service for many years, such as an aircraft assembled for large-scale war service (e.g., circa 1945, etc.) Thus, use of the data analyzer 130, surveyor 104, and legacy systems 112 may help identify parts to create the revised BOM 134 and create the 3D model 136 using 2D imagery and position information as disclosed herein.

In this embodiment, the aircraft 900 includes a fuselage 902 including wing assemblies 904, a tail assembly 906, and a landing assembly 908. The aircraft 900 further includes one or more propulsion units 910, a control system 912, and a host of other systems and subsystems that enable proper operation of the aircraft 900. One should appreciate that many parts included in an aircraft may be identified using 2D imagery using the techniques disclosed herein. In general, the various components and subsystems of the aircraft 900 may be of known construction and, for the sake of brevity, will not be described in detail herein.

Although the aircraft 900 shown in FIG. 9 is generally representative of a commercial passenger aircraft; however, the teachings of the present disclosure may be applied to the maintenance, manufacture, and assembly of other passenger aircraft, fighter aircraft, cargo aircraft, rotary aircraft, and any other types of manned or unmanned aircraft, as well as other types of vehicles disclosed herein.

Conclusion

While preferred and alternate embodiments of the disclosure have been illustrated and described, as noted above, many changes can be made without departing from the spirit and scope of the disclosure. Accordingly, the scope of the disclosure is not limited by the disclosure of these preferred and alternate embodiments. Instead, the disclosure should be determined entirely by reference to the claims that follow.

What is claimed is:

1. A method of determining a configuration of at least a portion of a target vehicle, the method comprising:
    surveying the portion of the target vehicle using an imaging device to generate 2D imagery of a configuration of the target vehicle;
    comparing the generated 2D imagery of the configuration to a survey library of 2D images to identify at least one part in the configuration; and
    extracting existing data from legacy systems for the at least one part, the existing data including at least one of associated part data or an existing drawing of the part,
    wherein the surveying the portion of the target vehicle to generate 2D imagery of a configuration of the target vehicle includes storing position information with the 2D imagery, the position information obtained from at least one of an imaging device or a position system.

2. The method of claim 1, further comprising updating a bill or materials with the at least one part that is included in the configuration of the target vehicle.

3. The method of claim 1, further comprising creating a 3D model of the configuration of the target vehicle, the 3D model including the at least one part that is associated with an existing drawing of the at least one part and arranged for a visual display in accordance with the position information to represent a 3D model of the configuration of the target vehicle.

4. The method of claim 1, further comprising identifying a unique feature of the generated 2D imagery, and wherein comparing the generated 2D imagery of the configuration to a survey library of 2D images includes comparing the unique feature of the generated 2D imagery the survey library.

5. The method of claim 1, wherein the comparing the generated 2D imagery of the configuration to a survey library of 2D images creates a match score associated with a matching part of the comparison, and wherein the matching part is selected as being in the configuration of the target vehicle when the match score exceeds a threshold value.

6. A system, comprising:
    a survey library to store 2D imagery of parts of a group of vehicles, the 2D imagery associated with part identifiers used to link the parts to additional data associated with the parts including at least one of a CAD drawing or a part description;
    a survey module to obtain 2D imagery of parts of a vehicle in the group of vehicles;
    a data analyzer to compare the obtained 2D imagery with imagery in the survey library, the data analyzer to generate a part match and an associated match score for each part of the vehicle that is identified in the survey library; and
    a configuration builder to select parts from part matches having a match score exceeding a threshold, the configuration builder to generate a revised bill of materials of the parts of the vehicle,
    wherein the survey module further obtains position information associated with the parts of the vehicle, and
    wherein the position information is derived from the location of imaging devices used to generate the 2D imagery.

7. The system of claim 6, wherein the survey module further obtains an identification zone, and wherein the obtained 2D imagery of the parts includes obtained 2D imagery of the identification zone, the identification zone enabling identification of the vehicle by the data analyzer directly from the obtained 2D imagery of the identification zone.

8. The system of claim 6, wherein the configuration builder uses the position information to build a 3D model of the configuration of the model using part information associated with the parts.

9. The system of claim 8, wherein the part information includes a computer aided design (CAD) drawing of the associated selected parts, and wherein the CAD drawings are oriented using the position information to create the 3D model of the configuration of the vehicle.

10. The system of claim 9, further comprising a part data collector to collect part data for the group of vehicles, the part data including a bill of materials and a CAD drawing.

11. A method of performing maintenance on a vehicle, the method comprising:

surveying an in-service vehicle with an imaging device to create 2D vehicle imagery associated with position information of the imagery;

matching the 2D vehicle imagery to imagery of known parts in a survey library, the imagery of known parts associated with a part identifier, the matching to determine a matched part of the in-service vehicle and the part identifier;

generating a bill of materials (BOM) by adding the part identifier to a list of parts of the vehicle; and performing maintenance on the vehicle by identifying parts using the BOM, wherein the known parts are associated with a computer aided design (CAD) drawing, and further comprising building a 3D model of the vehicle by associating the matched part with the CAD drawing, and positioning the CAD drawing based on an observed position of the part obtained during the surveying of the in-service vehicle.

12. The method of claim 11, wherein the matching includes using feature recognition of the 2D imagery to match a feature with a known feature in the survey library.

13. The method of claim 12, wherein the matching the feature with a known feature generates a match score for each matched part.

14. The method of claim 13, further comprising:

comparing the match score to a match threshold; and selecting the matched part when the match score at least reaches the match threshold.

15. The method of claim 11, wherein the matching and the generating the BOM are preformed while the vehicle is in-service and prior to maintenance.

* * * * *